United States Patent [19]
Nishioka

[11] Patent Number: 6,036,513
[45] Date of Patent: Mar. 14, 2000

[54] CONNECTOR DEVICE FOR IC CARD

[75] Inventor: Toru Nishioka, Miyagi-ken, Japan

[73] Assignee: Alps Electric Co., Ltd., Japan

[21] Appl. No.: 09/237,416

[22] Filed: Jan. 26, 1999

[30] Foreign Application Priority Data

Jan. 28, 1998 [JP] Japan .................................. 10-015825

[51] Int. Cl.[7] .................................................. H01R 13/62
[52] U.S. Cl. .......................................................... 439/159
[58] Field of Search .................................... 439/159, 152, 439/155, 541.5

[56] References Cited

U.S. PATENT DOCUMENTS

| | | |
|---|---|---|
| 5,499,925 | 3/1996 | Lwee . |
| 5,536,180 | 7/1996 | Ishida et al. ............................ 439/159 |
| 5,575,669 | 11/1996 | Lin et al. . |
| 5,599,197 | 2/1997 | Ishida et al. ............................ 439/159 |
| 5,655,918 | 8/1997 | Soh ......................................... 439/159 |
| 5,683,528 | 11/1997 | Takano et al. .......................... 439/159 |
| 5,846,096 | 12/1998 | Ishida ..................................... 439/159 |
| 5,871,365 | 2/1999 | Kajiura ................................... 439/159 |
| 5,906,510 | 5/1999 | Lwee ...................................... 439/159 |

OTHER PUBLICATIONS

U.S. application No. 09/237,709, filed Jan. 26, 1999.
U.S. application No. 09/234,026, filed Jan. 26, 1999.

*Primary Examiner*—Neil Abrams
*Assistant Examiner*—Brian Webb
*Attorney, Agent, or Firm*—Brinks Hofer Gilson & Lione

[57] ABSTRACT

In the connector device for IC card according to the present invention, when a first IC card as inserted into the connector device is to be ejected, a push rod is projected up to a first projecting position and is pushed in this state, whereby the IC card is ejected through a single transfer pin. For ejecting a second IC card, the push rod is pulled from the first projecting position and is projected up to a second projecting position which is located on this side with respect to the first projecting position, then in this state the push rod is pushed toward a push-in position, so that the second IC card is ejected by rotation of a single transfer pin. Thus, a single push rod and a single transfer pin suffice to afford a connector device which is reduced in the number of components used, less expensive, superior in assembling performance and small-sized.

8 Claims, 14 Drawing Sheets

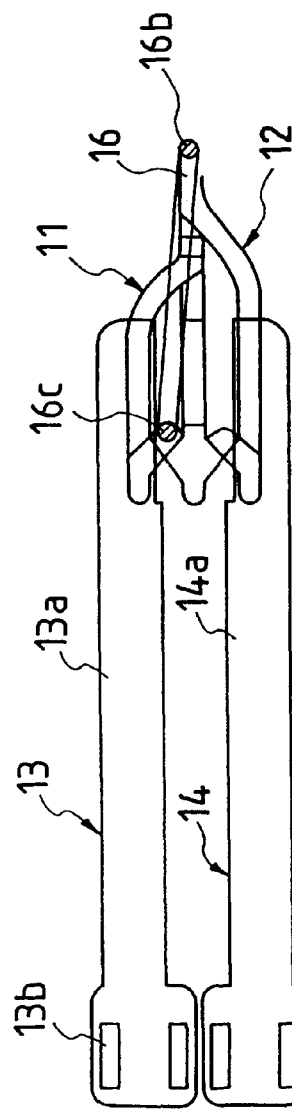
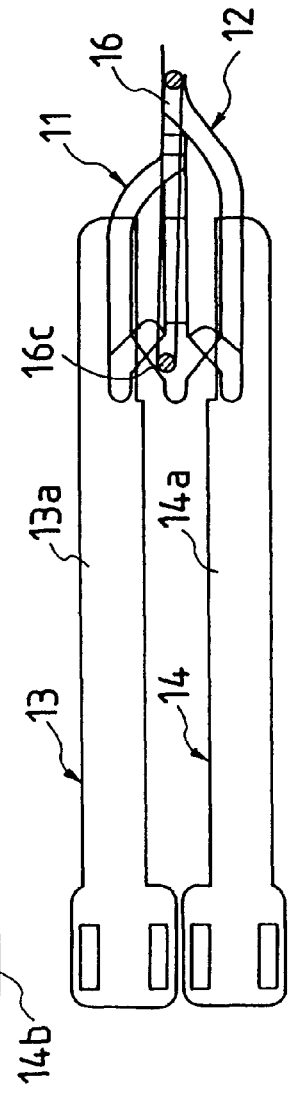
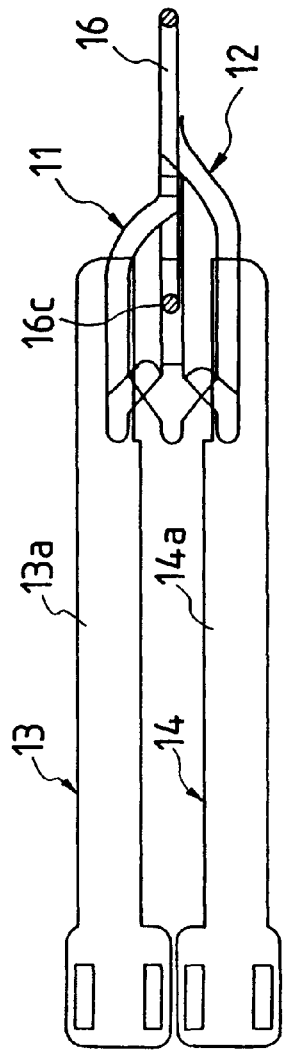
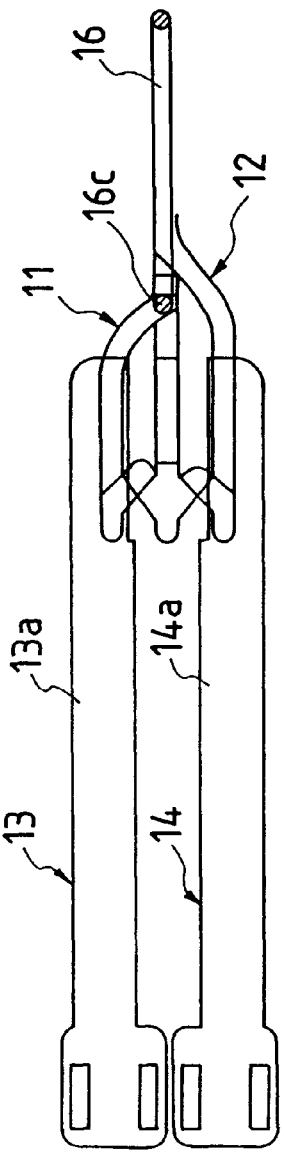
FIG. 20A
FIG. 20B
FIG. 20C
FIG. 20D

CONNECTOR DEVICE FOR IC CARD

BACKGROUND OF THE INVENTION

1. Field of the Invention

The present invention relates to a connector device for IC card to be mounted in an apparatus which is used by inserting and pulling two IC cards into and out of the apparatus.

2. Description of the Related Art

Generally, a connector device for IC card substantially comprises a pin header having a large number of pin contacts to be connected to socket contacts disposed in the IC card, the pin contacts being disposed in a pin housing, a frame for guarding the IC card when inserted or ejected, and an ejection mechanism for ejecting from the pin contacts the IC card as inserted. There also is known a connector device for IC card wherein the housing and the frame are formed in one piece with each other.

In a connector device for IC card disclosed in Japanese Published Unexamined Utility Model Publication No. Hei 6-13072, two IC cards are disposed in two vertical stages in a guide portion of a frame so that they can be inserted and ejected by two push rods respectively which are mounted in an up-down relation to each other, and two ejection mechanisms connected respectively to the two push rods are disposed at upper and lower positions of the frame. The ejection mechanisms are each provided with first and second transfer levers which are linked between the associated push rod and a slide plate, a third transfer lever supported pivotally by the first transfer lever and capable of being engaged with and disengaged from the second transfer lever, and a heart cam mechanism capable of holding the push rod at a push-in position and a first projecting position. Pushing force of the push rod is transmitted selectively to the slide plate in proportion to the amount of projection of the push rod.

More particularly, with an IC card inserted, the push rod is held at the push-in position and the third transfer lever is not in engagement with the second transfer lever, but if the push rod is projected up to the first projecting position by the heart cam mechanism and is thereafter pulled up to a second projecting position closer to the user side, the third transfer lever comes into engagement with the second transfer lever at the second projecting position. In this state, therefore, if the push rod is pushed toward the push-in position, the pushing force is transmitted to the slide plate through each transfer lever, so that the slide plate pushes (ejects) the IC card toward the user side.

In this way, the upper and lower IC cards are each ejected by operating the two push rods each individually as above.

Thus, according to the connector device for IC card disclosed in the foregoing unexamined publication, two IC cards are used and two push rods are disposed in an up-down relation to each other. Therefore, there arises such problems as an increase in the number of components used, an increase of cost, deterioration of the assembling performance, and an increase in vertical size of the connector device.

Moreover, since three transfer levers, which are linked together, are disposed between the push rod and the slide plate and the pushing force of the push rod is transmitted to the slide plate or is cut off according to postures of those transfer levers, it is necessary to ensure a wide space for rotation of the transfer levers, that is, the reduction in size of the connector device for IC card is obstructed.

SUMMARY OF THE INVENTION

For solving the above-mentioned problems, according to the present invention, in the first aspect thereof, there is provided a connector device for IC card, including: a frame for supporting two, first and second IC cards so as to permit insertion and ejection of the IC cards with respect to the connector device; a push rod capable of reciprocating between a push-in position and a projecting position; and a transfer pin secured to the push rod pivotably, wherein with the first and/or second IC card inserted into the connector device, the push rod is held at the push-in position by a lock mechanism of the transfer pin, and in this state, by a first pushing motion of the push rod, the lock mechanism of the transfer pin is unlocked and the push rod moves to the first projecting position, then at this first projecting position the first IC card is ejected by the transfer pin in accordance with a second pushing motion of the push rod, the push rod being movable to a second projecting position projecting to a further extent from the first projecting position, further, when the push rod is at the first projecting position, the push rod is moved to the second projecting position by a pulling motion thereof, and with the push rod lying at the second projecting position, the transfer pin is rotated to effect the ejection of the second IC card when the push rod performs the pushing motion.

In the second aspect of the present invention there is provided, in combination with the connector device in the first aspect, a connector device for IC card wherein the lock mechanism is made up of two, juxtaposed, first and second heart cam grooves, the transfer pin is rotated and allowed to trace the first and second heart cam grooves, further, two, first and second drive plates engageable with and disengageable from the transfer pin and capable of reciprocation are provided, and when the push rod lying at the first projecting position is pushed, the transfer pin, in an engageable state with the first drive plate, traces the first heart cam groove and moves the first drive plate, causing the IC card to be ejected through the first drive plate, while when the push rod lying at the second projecting position is pushed, the transfer pin, in an engageable state with the second drive plate, traces the second heart cam groove and moves the second drive plate to effect the ejection of the second IC card through the second drive plate.

In the third aspect of the present invention there is provided, in combination with the connector device in the second aspect, a connector device for IC card wherein adjacent cam grooves of the juxtaposed, first and second heart cam grooves are used partially in common.

In the fourth aspect of the present invention there is provided, in combination with the connector device in the second aspect, a connector device for IC card wherein when the push rod is at the push-in position, the transfer pin is locked by the first heart cam groove and is disengaged from the first drive plate, and when the push rod is pushed at the push-in position, the transfer pin moves together with the push rod and traces the first heart cam groove, with the transfer pin becoming engageable with the first drive plate, allowing the push rod to assume the first projecting position, while when the push rod is pulled at the first projecting position into the second projecting position, the transfer pin becomes engageable with the second drive plate, then when the push rod is pushed in this state, the transfer pin traces the second heart cam groove and is locked by the second heart cam groove, allowing the push rod to assume the push-in position, and the transfer pin becomes disengaged from the second drive plate, further, when the push rod is pushed at the push-in position, the transfer pin moves together with the push rod and traces the second heart cam groove, with the transfer pin becoming engageable with the first drive plate, allowing the push rod to assume the first projecting position.

In the fifth aspect of the present invention there is provided, in combination with the connector device in the second aspect, a connector device for IC card wherein the transfer pin is formed in U shape having an upper side portion and bent portions formed at both ends of the upper side portion, the push rod has a protuberance, the upper side portion of the transfer pin is brought into abutment against the protuberance, one bent portion of the transfer pin is brought into engagement with the heart cam grooves, and between the one bent portion of the transfer pin and the protuberance, the upper side portion of the transfer pin is pressed resiliently by a resilient member.

In the sixth aspect of the present invention there is provided, in combination with the connector device in the fifth aspect, a connector device for IC card wherein the bent portions formed at both ends of the upper side portion of the U-shaped transfer pin have the same length.

In the seventh aspect of the present invention there is provided, in combination with the connector device in the first aspect, a connector device for IC card wherein a knob is attached to the push rod which is a movable side connected movably to the frame which is a fixed side, a retaining piece having resilience is provided on either the fixed side or the movable side and a retaining portion is provided on the other side, the retaining piece and the retaining portion coming into engagement with each other when the push rod is at the first projecting position, to retain the push rod at the first projecting position, the retaining piece and the retaining portion becoming disengaged from each other when the push rod lying at the first projecting position is pulled, to permit movement of the push rod to the second projecting position.

In the eighth aspect of the present invention there is provided, in combination with the connector device in the seventh aspect, a connector device for IC card wherein the retaining piece is provided on the knob side and the retaining portion is provided on the frame side.

BRIEF DESCRIPTION OF THE DRAWINGS

FIGS. 6A to 6D are diagrams showing a frame used in the connector device for IC card, in which FIG. 6A, FIG. 6B, FIG. 6C and FIG. 6D are a plan view, a front view, a bottom view and a right side view, respectively, of the frame;

FIGS. 7A and 7B are diagrams showing a push rod used in the connector device for IC card, in which FIG. 7A and FIG. 7B are a plan view and a front view, respectively, of the push rod;

FIGS. 8A and 8B are diagrams showing a drive plate used in the connector device for IC card, in which FIG. 8A and FIG. 8B are a plan view and a front view, respectively, of the drive plate;

FIGS. 9A and 9B are diagrams showing a resilient member used in the connector device for IC card, in which FIG. 9A and FIG. 9B are a plan view and a front view, respectively, of the resilient member;

FIGS. 10A to 10E are diagrams showing a knob used in the connector device for IC card, in which FIG. 10A, FIG. 10B, FIG. 10C, FIG. 10D and FIG. 10E are a plan view, a front view, abottom view and a sectional view of principal portions, respectively, of the knob;

FIGS. 20A to 20G are explanatory diagrams showing ejecting operations for a first IC card in the connector device for IC card.

DETAILED DESCRIPTION OF A PREFERRED EMBODIMENT

Figure 1:
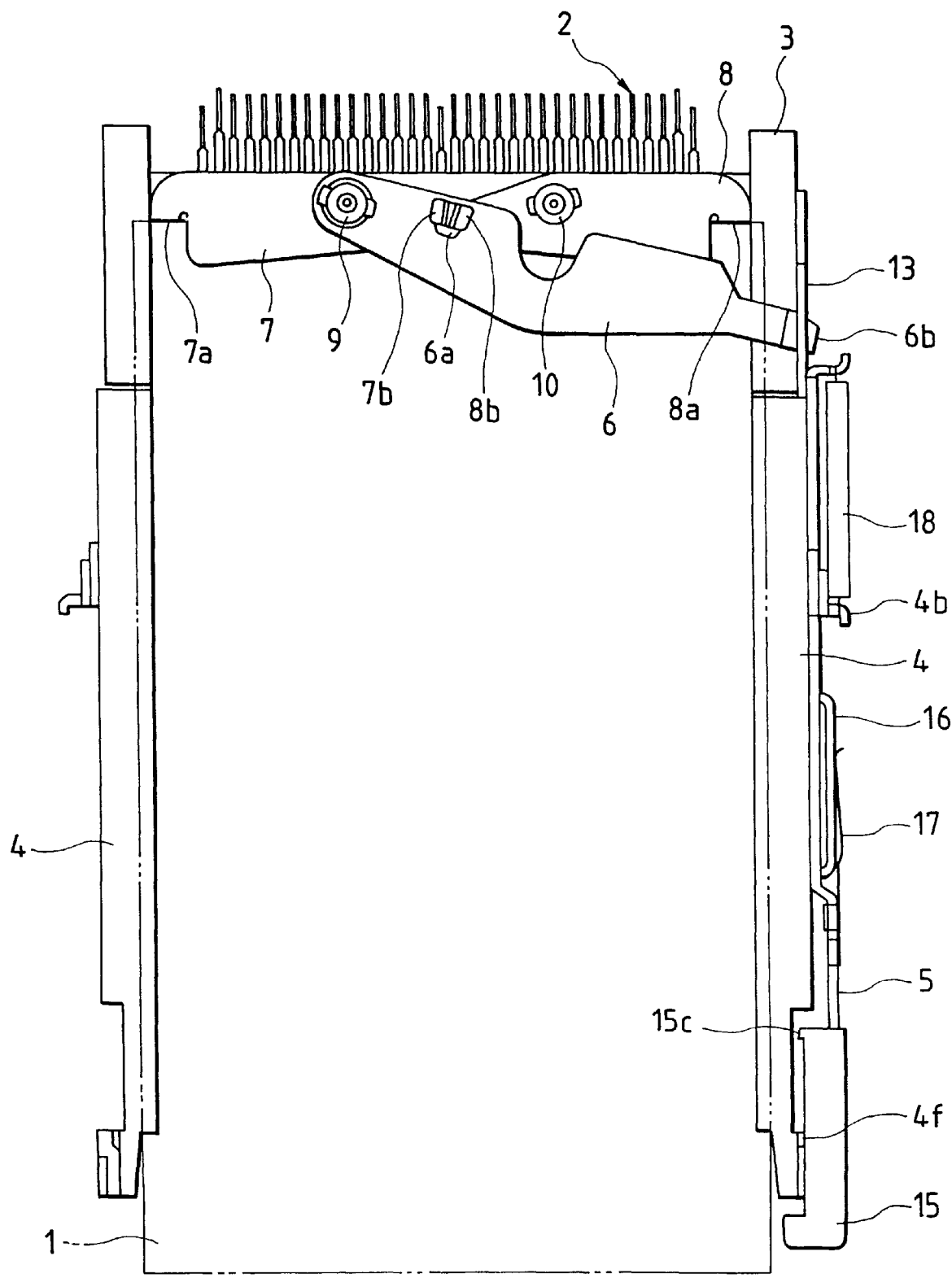
FIG. 1 is a plan view of a connector device for IC card according to an embodiment of the present invention with an IC card inserted therein.

A connector device for IC card according to an embodiment of the present invention will be described in detail hereinunder with reference to FIGS. 1 to 21.

As shown in FIGS. 1 to 21, the connector device for IC card embodying the present invention mainly comprises a pin housing 3 having a large number of pin contacts 2 for connection with socket contacts (not shown) disposed in an IC card 1, the pin contacts 2 being arranged two sets in an up-down relation to each other and press-fitted and fixed into the pin housing 3 at a predetermined arrangement, a pair of frames 4 fixed to the pin housing 3 and functioning to guide the two IC cards 1 from both transverse sides when the IC cards are inserted into the connector device or when ejected therefrom, a push rod 5 attached movably to one of the frames 4, ejection arms 6 pivotally secured to the pin housing 3, and first and second pivotable arms 7, 8 which are also pivotally secured to the pin housing 3. Between the push rod 5 and each ejection arm 6 is disposed an ejection mechanism which will be described later.

Although the ejection arms 6 and the first and second pivotable arms 7, 8 are provided in both upper and lower portions of the pin housing 3, only those provided in one portion are shown in the drawings.

Figure 2:
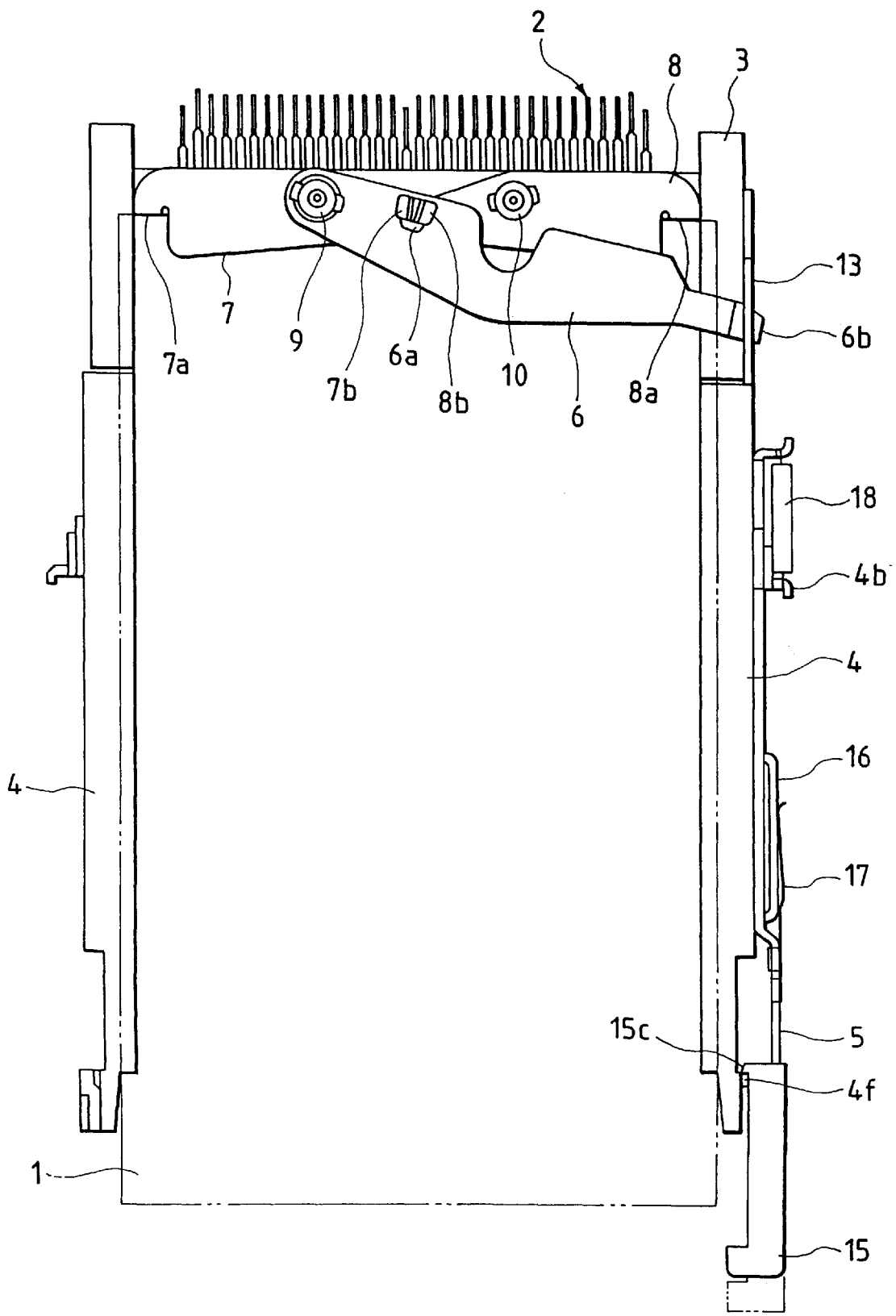
FIG. 2 is a plan view of the connector device with the IC card inserted therein and with a push rod lying in a first projecting position.
Figure 3:
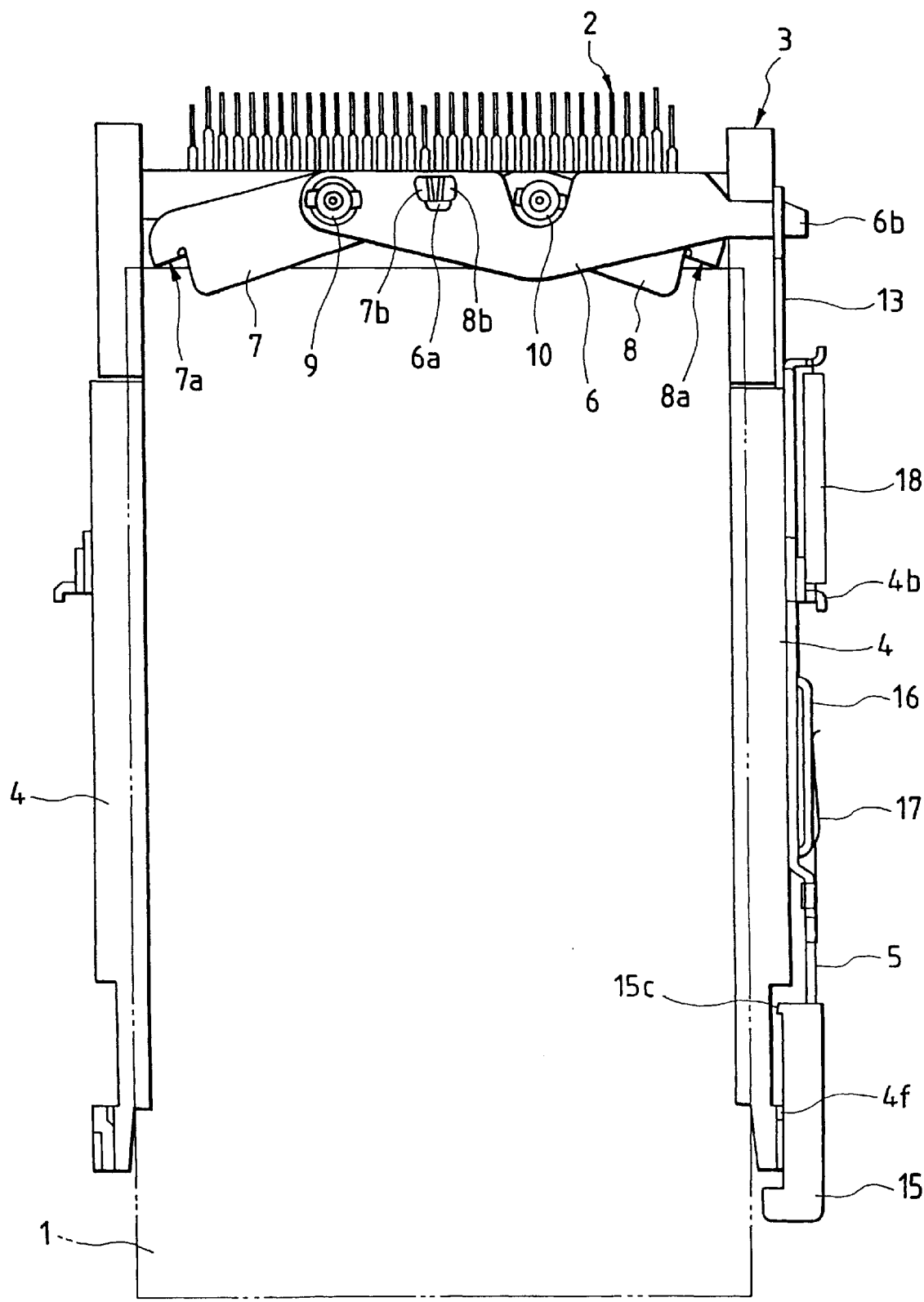
FIG. 3 is a plan view of the connector device for IC card, showing a state just after ejection of the IC card.
Figure 4:
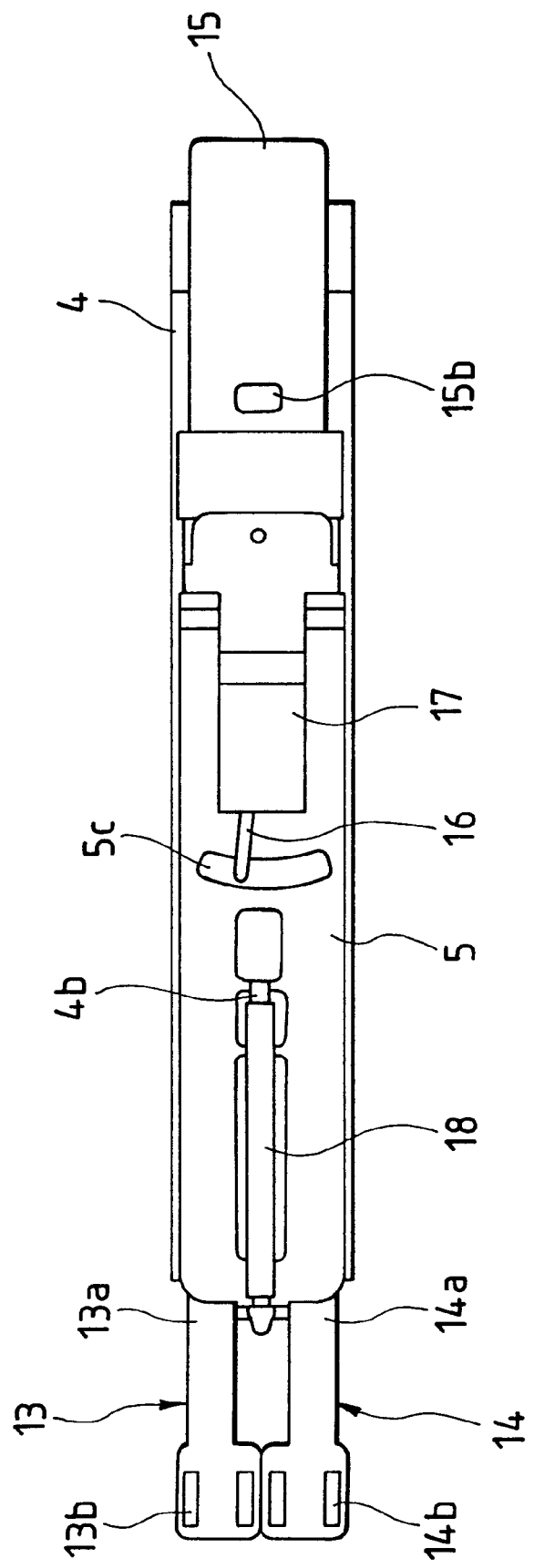
in FIG. 4 is a right side view of principal portions in FIG. 1.
Figure 5:
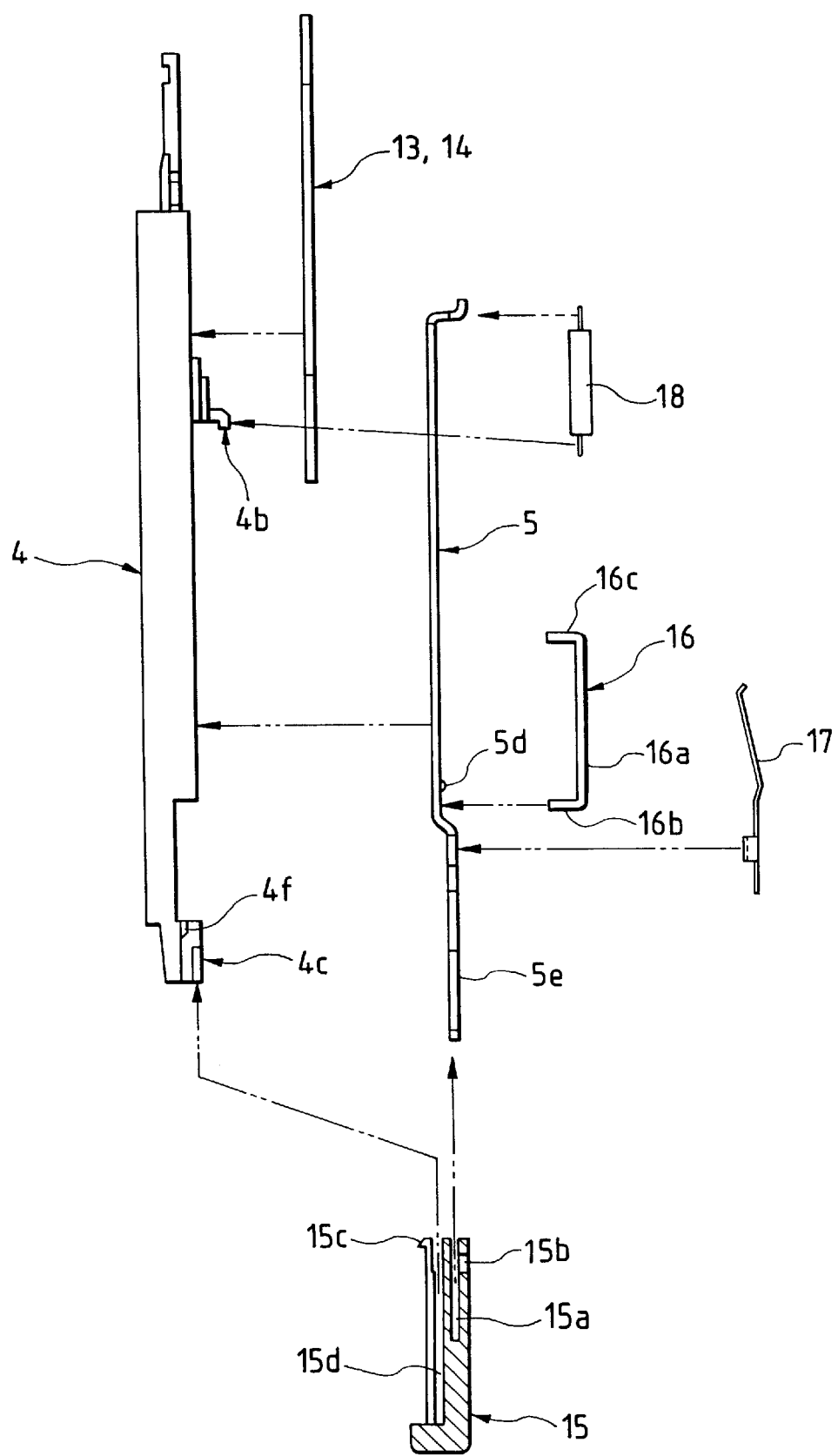
FIG. 5 is an exploded view showing principal portions of an ejection mechanism used in the connector device for IC card.
Figure 6A:
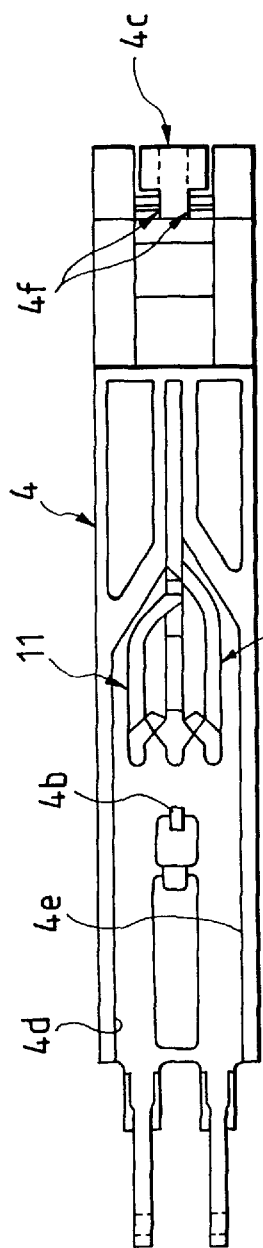
Figure 6B:
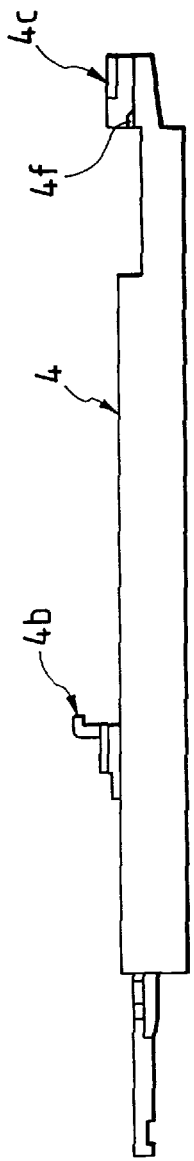
Figure 6C:
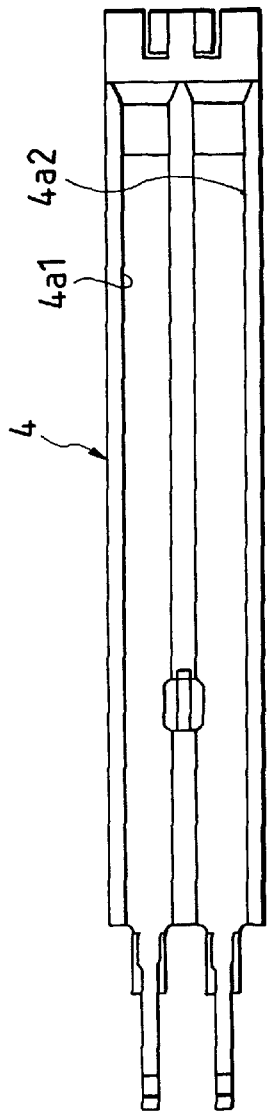
Figure 6D:
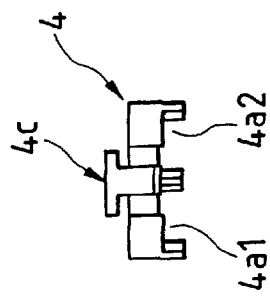

As shown in FIGS. 1 to 3, the pin housing 3 is provided in its upper portion with a first pivot shaft 9 and a second pivot shaft 10, which are spaced from each other at a predetermined interval. One end of the ejection arm 6 is pivotably mounted on the first pivot shaft 9.

The ejection arm 6 is formed with a connecting hole 6a and an engaging portion 6b, the engaging portion 6b projecting outward from the pin housing 3.

The first pivotable arm 7 is also pivotably mounted on the first pivot shaft 9 and is formed with a pawl piece 7a for pushing out the IC card and a tongue piece 7b projecting into the connecting hole 6a of the ejection arm 6.

The second pivotable arm 8 is pivotably mounted on the second pivot shaft 10 and is formed with a pawl piece 8a for pushing out the IC card 1 and a tongue piece 8b projecting into the connecting hole 6a of the ejection arm 6.

The above construction also applies to the lower portion of the pin housing 3, an explanation thereof will here be omitted.

The construction of the ejection mechanism will now be described. The connector device for IC card embodying the invention permits insertion and ejection of the two IC cards 1 along guide grooves 4a1 and 4a2 formed in inner side faces of the paired frames 4, with a single push rod 5 for ejection of the two IC cards 1 being secured to an outer side face of one frame 4.

Particularly, as shown in FIGS. 5, 6A to 6D and 15 to 19, a pair of guide projections 4b and 4c are formed on the outer side face of each frame 4. Between the guide projections 4b and 4c are formed first and second heart cam grooves 11, 12 which constitute a lock mechanism.

The first and second heart cam grooves 11, 12 are formed side by side while using part of adjacent cam grooves in common. More specifically, the heart cam grooves 11 and 12 have cam faces of different heights and use cam faces A1, H, E1 and D1 partially in common. Further, cam faces J and E2 are extended from cam face D1 to connect the first and second heart cam grooves 11, 12 with each other.

Figure 7A:
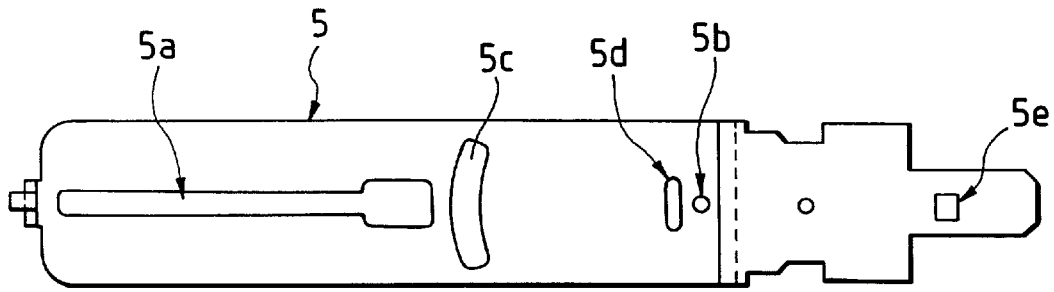
Figure 7B:
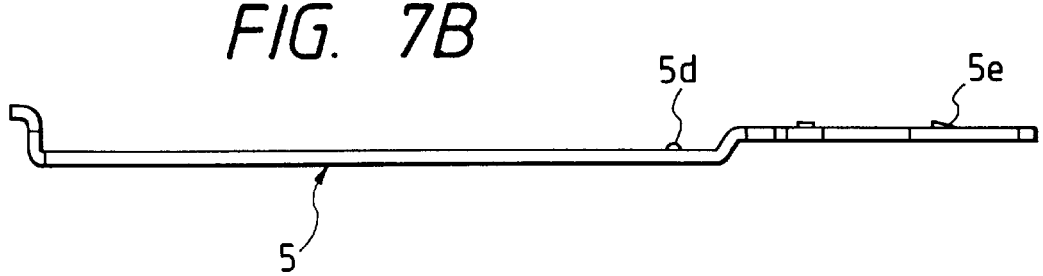
Figure 8A:
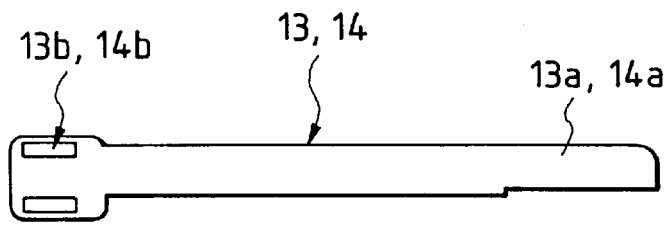
Figure 8B:

First and second drive plates 13, 14 are secured to the outer side face of one frame 4 so that they can reciprocate. As shown in FIGS. 7A and 7B, the first and second drive plates 13, 14, which are of the same shape, have receiving portions 13a, 14a and engaging holes 13b, 14b. In mounting them to the frame 4, one drive plate is turned upside down so that the first and second drive plates 13, 14 become symmetric with each other, as shown in FIGS. 20A to 20G and 21A to 21D.

The receiving portion 13a of the first drive plate 13 is positioned on the first heart cam groove 11 and is held reciprocatably by a guide recess 4d formed in the frame 4. Likewise, the receiving portion 14a of the second drive plate 14 is positioned above the second heart cam groove 12 and is held reciprocatably by a guide recess 4e formed in the frame 4.

Engaging portions 6b of the upper and lower ejection arms 6 are engaged respectively with the engaging holes 13b and 14b of the first and second drive plates 13, 14.

A single push rod 5 is mounted to the outer side face of the frame 4 from above the first and second drive plates 13, 14. The push rod 5 is held by a guide projection 4b of the frame 4 so that it can reciprocate in the directions of insertion and ejection of the IC cards 1.

Such a knob 15 as shown in FIGS. 10A to 10E is attached to one end of the push rod 5.

The knob 15 has a hole 15a, an engaging hole 15b communicating with the hole 15a, retaining pieces 15c having resilience, with a projection being formed at a lower extremity of each retaining piece 15c, and a groove 15d. An end portion of the push rod 5 is tightly fitted in the hole 15a and a lug 5e formed on the push rod 5 is fitted in the engaging hole 15b, whereby the knob 15 and the push rod 5 are connected together. The retaining pieces 15c of the knob 15 can be engaged with and disengaged from retaining portions 4f of the frame 4, the retaining portions 4f being formed as projections. The guide projection 4c of the frame 4 is fitted in the groove 15d, thereby permitting the knob 15 to move while being guided by the guide projection 4c.

As shown in FIGS. 7A and 7B, a guide hole 5a is formed in the push rod 5 and it is fitted on the guide projection 4b of the frame 4.

A pivot hole 5b and a relief hole 5c are formed in the push rod 5, with a protuberance 5d being formed between the pivot hole 5b and the relief hole 5c.

One transfer pin 16, which is bent in U shape, is secured to the outer side face of the push rod 5.

The transfer pin 16 comprises an upper side portion 16a and bent portions 16b, 16c formed by bending at both ends of the upper side portion 16a, the bent portions 16b and 16c having the same length. One bent portion 16b is inserted into the pivot hole 5b, while the other bent portion 16c passes through the relief hole 5c and is engageable selectively with the cam faces of the first and second heart cam grooves 11, 12. When the transfer pin 16 moves together with the push rod 5, its bent portion 16c can be engaged with or disengaged from the first and second drive plates 13, 14.

The transfer pin 16 is pivotable with the pivot hole 5b as fulcrum. Further, its upper side portion 16a comes into abutment onto the protuberance 5d of the push rod 5, whereby the bent portion 16c of the transfer pin 16 can move vertically in proportion to the height of each cam face and with the protuberance 5d as fulcrum. Since the transfer pin 16 moves pivotally on the protuberance 5d, the frictional resistance between the push rod 5 and the transfer pin 16 is small, thus permitting a smooth movement of the transfer pin.

Figure 9A:
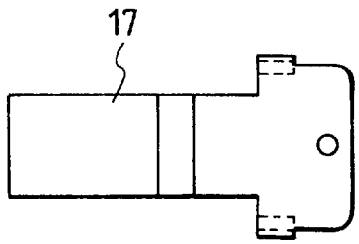
Figure 9B:
Figure 10A:
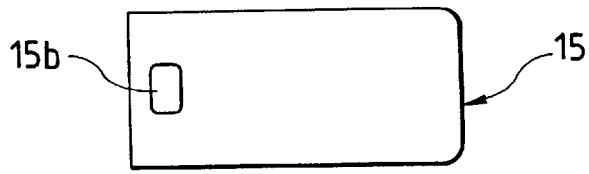
Figure 10B:
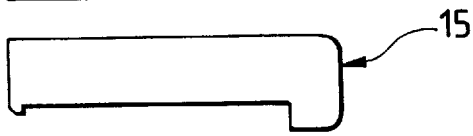
Figure 10C:
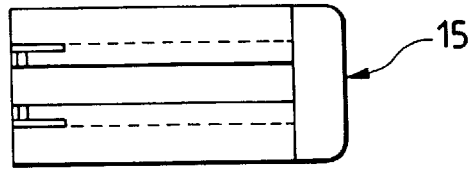
Figure 10D:
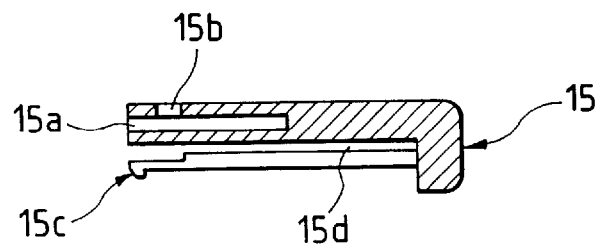
Figure 10E:
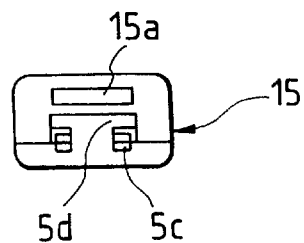
Figure 11:
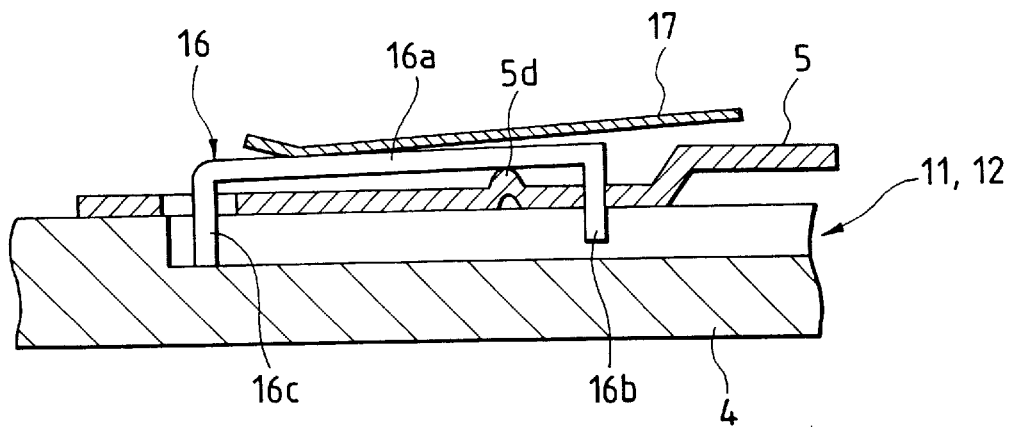
FIG. 11 is a sectional view showing principal portions of the ejection mechanism used in the connector device for IC card.

A resilient member 17 constituted by such a plate spring as shown in FIG. 9 is attached to the push rod 5. As shown in FIG. 11, the resilient member 17 presses the upper side portion 16a of the transfer pin 16 resiliently between the bent portion 16c of the transfer pin 16 and the protuberance 5d of the push rod 5, causing its bent portion 16c to be in elastic contact with a cam face and at the same time causing the transfer pin 16 to be tilted to move the bent portion 16b side away from a cam face.

The resilient member 17 may be formed integrally with or separately from a mounting member for mounting the push rod 5 though not shown, or it may be secured to the frame 4.

A coiled spring 18 is stretched between the guide projection 4b of the frame 4 and the push rod 5, whereby the push rod 5 is urged in a projecting direction from the front face of the frame 4.

Figure 16:
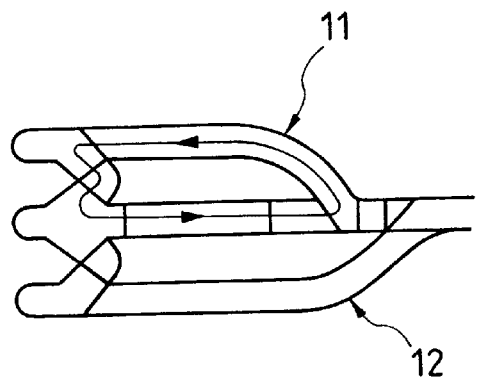
FIG. 16 is an explanatory diagram showing in what manner a transfer pin traces a first heart cam groove used as a lock mechanism in the connector device for IC card.
Figure 17:
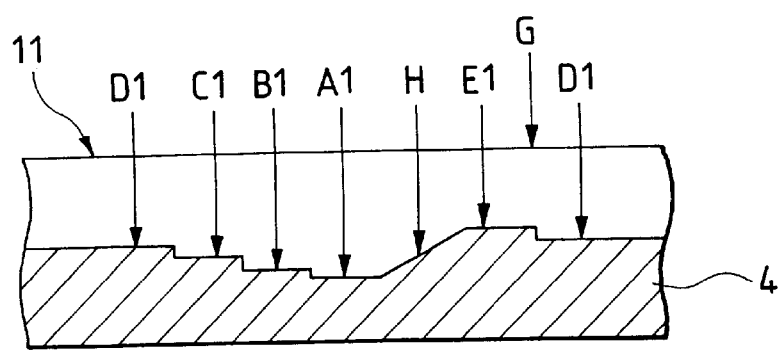
FIG. 17 is an explanatory diagram showing the heights of various cam face formed in the first heart cam groove which is used as a lock mechanism in the connector device for IC card.

In interlock with the pushing motion of the push rod 5 the bent portion 16c of the transfer pin 16 traces the cam faces of the first heart cam groove 11 in the arrowed direction indicated by a solid line in FIG. 16. When the bent portion 16c is engaged with the cam face B1, the push rod 5 is held at its push-in position shown in FIGS. 1 and 12, while when the bent portion 16c has shifted from cam face E1 to D1 and the retaining pieces 15c of the knob 15 have come into engagement with the retaining portion 4f of the frame 4, the push rod 5 is held at the first projecting position, as shown in FIGS. 2 and 13.

Figure 18:
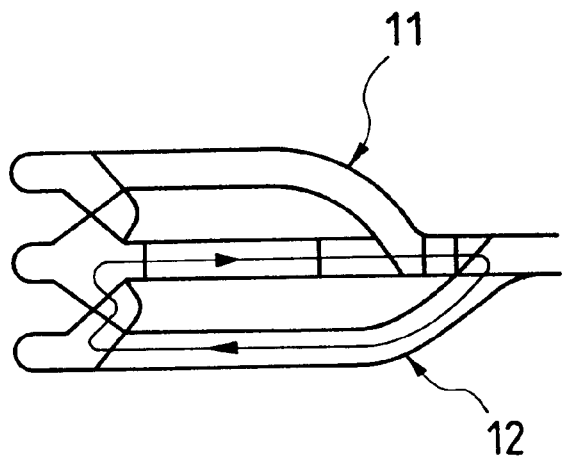
FIG. 18 is an explanatory diagram showing in what manner the transfer pin traces a second heart cam groove used as a lock mechanism in the connector device for IC card.
Figure 19:
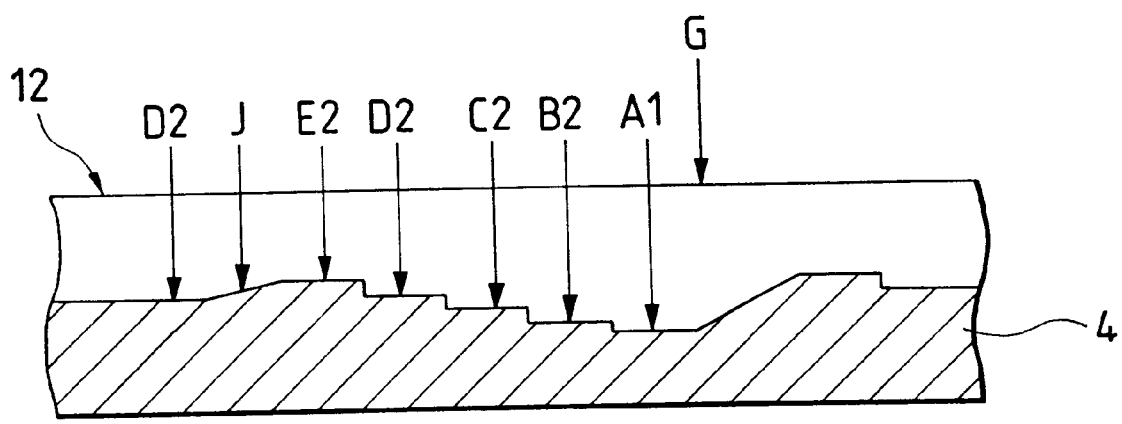
FIG. 19 is an explanatory diagram showing the heights of various cam faces formed in the second heart cam groove which is used as a lock mechanism in the connector device for IC card.

Further, interlockedly with the pushing motion of the push rod 5, the bent portion 16c of the transfer pin 16 can trace the cam faces of the second heart cam groove in the arrowed direction indicated by a solid line in FIG. 18. When the bent portion 16c is engaged with the cam face B2, the push rod 5 is held at the push-in position shown in FIGS. 1 and 12, while when the bent portion 16c has shifted from the common cam face E1 to D1 and the retaining piece 15c of the knob 15 has come into engagement with the retaining portion 4f of the frame 4, the push rod 5 is held at the first projecting position, as shown in FIGS. 2 and 13.

Further, against the force of engagement between the retaining piece 15c of the knob 15 and the retaining portion 4f of the frame 4, the push rod 5 can be moved from the first projecting position up to a second projecting position (the position indicated by a dotted line in FIG. 2 and the state shown in FIG. 14) which is closer to the user side. At the second projecting position, one end of the guide hole 15a of the push rod 5 comes into abutment against the guide projection 4b of the frame 4 to stop the movement of the knob 15 and that of the push rod 5.

On the other hand, in interlock with the pulling motion of the push rod 5, the bent portion 16c of the transfer pin 16 leaves the cam face D1, then passes the cam faces J, E2 and reaches the position of D2. If in this state the push rod 5 is pushed, the bent portion 16c leaves the cam face D2 and reaches the cam face C2. Upon subsequent cancellation of the pushing motion, the push rod 5 is slightly pushed back by the coiled spring 18 and the bent portion 16c assumes the push-in position at which it is engaged with the cam face B2.

Figure 12:
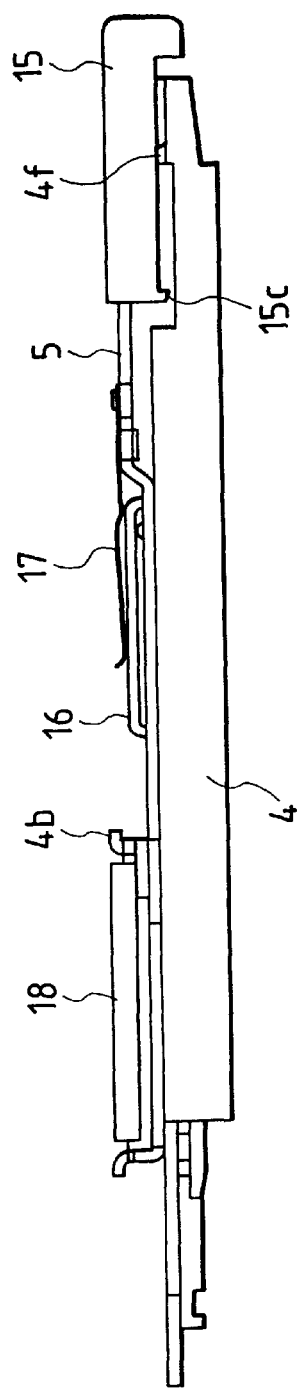
FIG. 12 is a diagram explanatory of the connector device for IC card, with the push rod lying at a push-in position.
Figure 13:
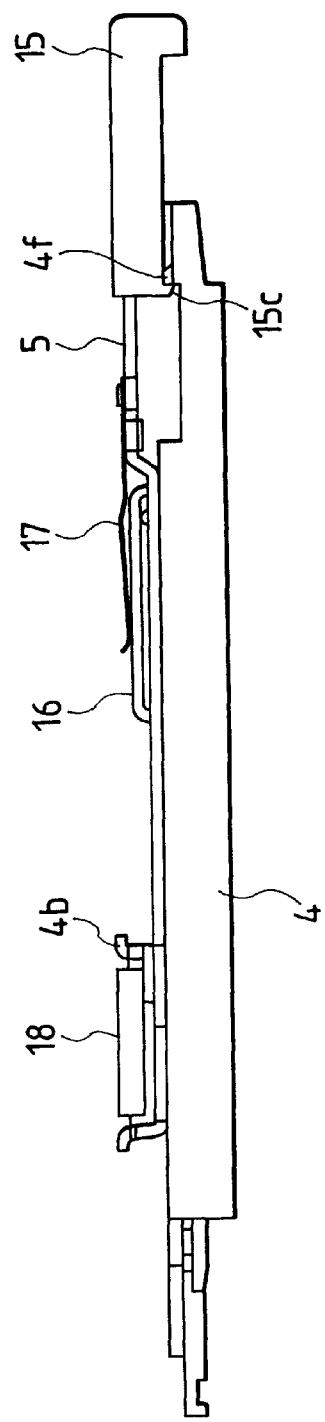
FIG. 13 is a diagram explanatory of the connector device for IC card, with the push rod lying at the first projecting position.
Figure 14:
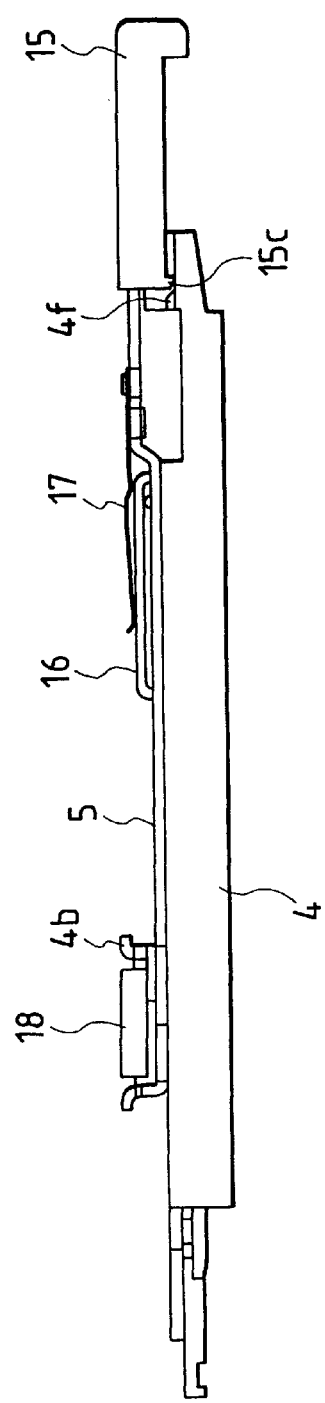
FIG. 14 is a diagram explanatory of the connector device for IC card, with the push rod lying at a second projecting position.
Figure 15:
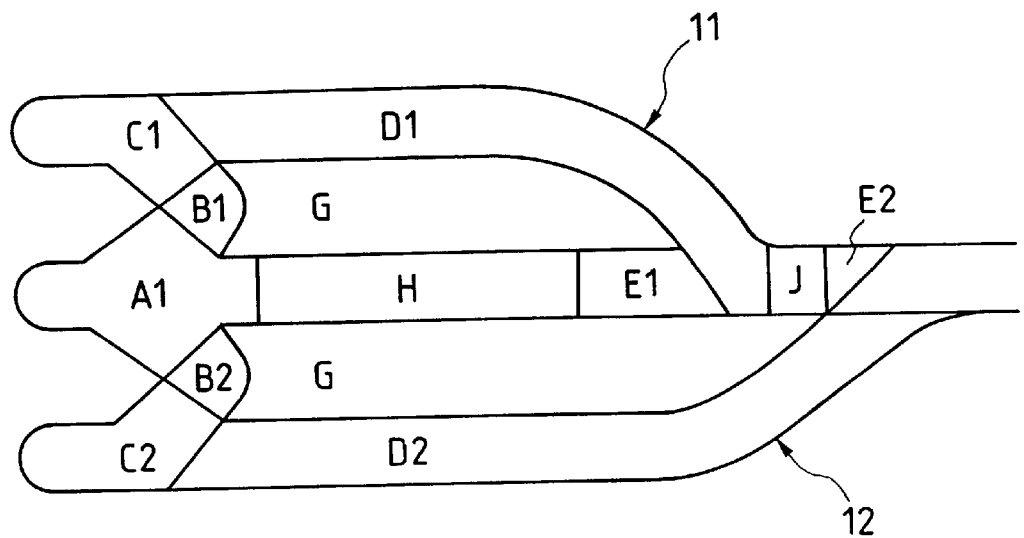
FIG. 15 is an explanatory diagram showing heart cam grooves used as a lock mechanism in the connector device for IC card.

Thus, the transfer pin 16 traces the first and second heart cam grooves 11, 12 selectively and the retaining piece 15c of the knob 15 gets over the retaining portion 4f and shifts from the state of FIG. 14 to the state of FIG. 12 which corresponds to the push-in position.

In connection with the connector device for IC card constructed as above, the normal operation mode involving insertion of the first IC card as an upper-stage card and subsequent ejection thereof will first be described below mainly with reference to FIGS. 15, 16, 17 and 20A to 20G.

When the first and/or the second IC card 1 is not inserted into the connector device, the push rod 5 is held at the push-in position shown in FIGS. 1 and 12.

At this time, as shown in FIG. 20A, the bent portion 16c of the transfer pin 16 is engaged with the cam face B1 of the first heart cam groove 11, and the push rod 5 is held stably at the push-in position by the pulling force of the coiled spring 18 and by the transfer pin 16 which is engaged with the cam face B1.

In this state, as the first IC card is inserted along the guide grooves 4a1 of the frames 4, the IC card, which is advancing toward the pin housing 3, causes the pin contacts 2 of the pin housing 3 to be press-fitted into its socket contacts while pushing in the pawl pieces 7a and 8a of the first and second pivotable arms 7, 8. In this way the IC card 1 is inserted a predetermined distance into the connector device, whereupon the insertion is completed. In this completely inserted state, the IC card is sure to be connected with the pin contacts 2.

In association with the above operation, the first and second pivotable arms 7, 8 rotate reversely to each other about the first and second pivot shafts 9, 10, respectively, and the rotations of the pivotable arms 7 and 8 are transmitted to the ejection arm 6 through the connection between the tongue pieces 7b, 8b and the connecting hole 6a, so that the ejection arm 6 rotates about the first pivot shaft 9, and interlockedly with this rotation the first drive plate 13 moves to a position in front of the associated frame 4.

Figure 20E:
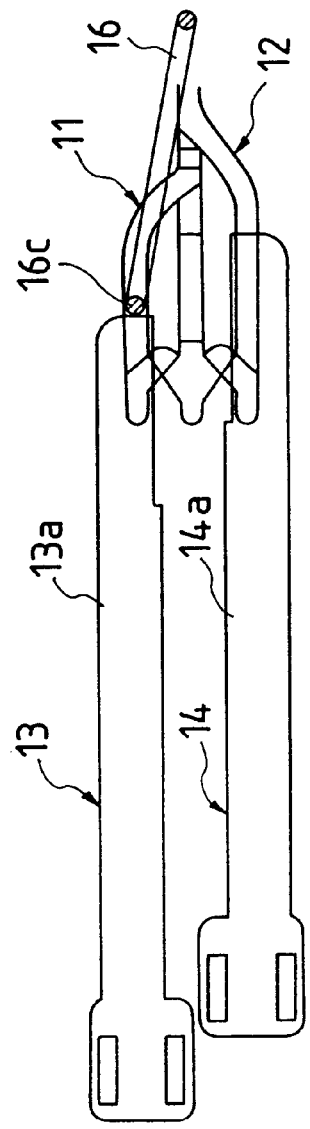
Figure 20F:
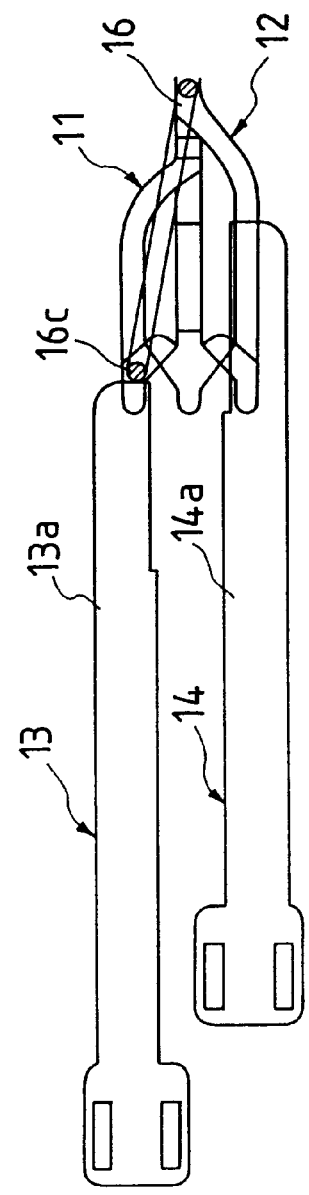
Figure 20G:
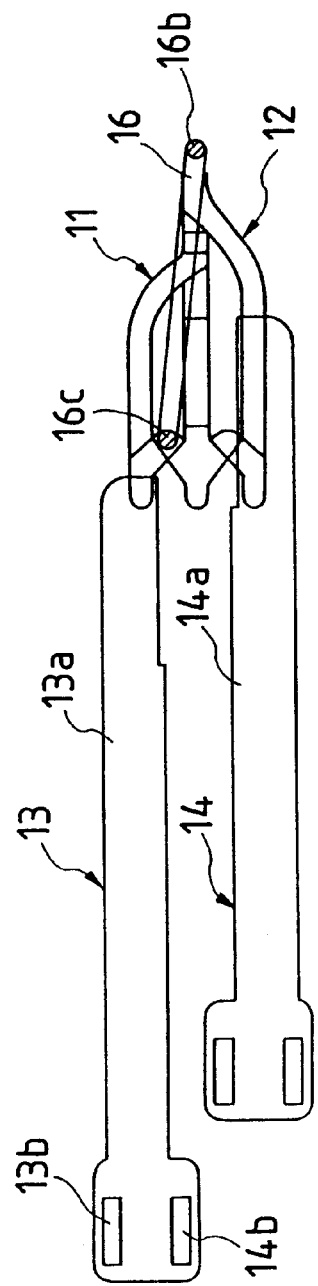

As a result, as shown in FIGS. 20G to 20A, the receiving portion 13a of the first drive plate 13 shifts from the state where it lies on the cam face C1 of the first heart cam groove 11 to the state where it lies on the cam face D1. However, since the bent portion 16c of the transfer pin 16 is engaged with the cam face B1 deviated from the cam face D1, the transfer pin 16 maintains this state, and during connection of the first IC card 1, the push rod 5 remains at the push-in position.

As the second IC card 1 is inserted along the guide grooves 4a2 of each frame 4, the IC card 1 which advances toward the lower pin housing 3 causes the pin contacts 2 of the pin housing 3 to be press-fitted into its socket contacts while pushing in the pawl pieces 7a and 8a of the lower, first and second pivotable arms 7, 8 in the same manner as noted previously. Thus, by inserting the IC card 1 a predetermined amount into the connector device, there is attained a completely inserted state in which the IC card 1 is sure to be in contact with the pin contacts 2.

In association with this operation, the first and second pivotable arms 7, 8 rotate reverse to each other about the first and second pivots shafts 9, 10, respectively, and the rotations of the pivotable arms 7 and 8 are transmitted to the ejection arm 6 through the connection between the tongue pieces 7b, 8b and the connecting hole 6a, so that the ejection arm 6 rotates about the first pivot shaft 9, and interlockedly with this rotation the second drive plate 14 moves to a position in front of the frame 4.

Figure 21A:
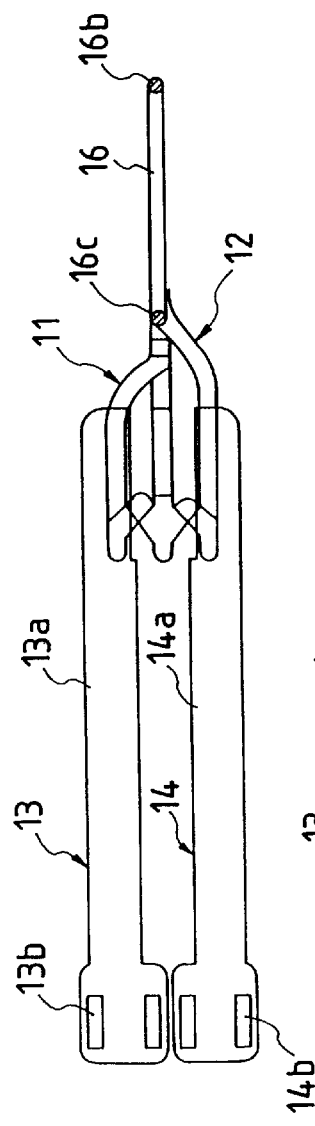
FIGS. 21A to 21D are explanatory diagrams showing ejecting operations for a second IC card in the connector device for IC card.
Figure 21B:
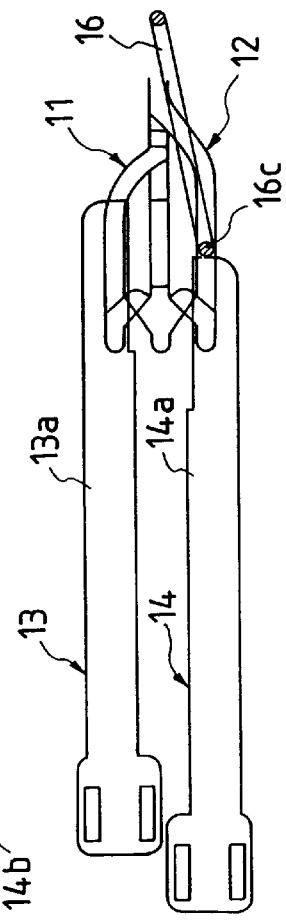
Figure 21C:
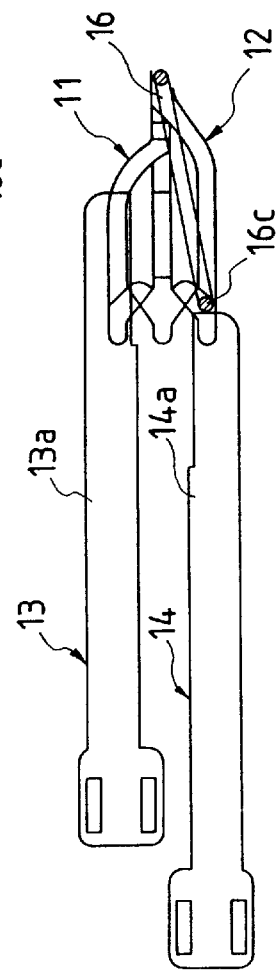
Figure 21D:
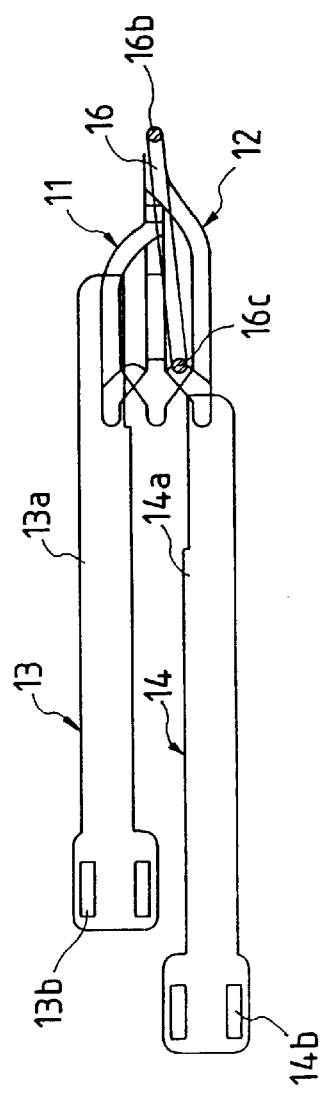

As a result, the receiving portion 14a of the second drive plate 14 shifts from the state where it lies on the cam face C2 of the second heart cam groove 12 to the state where it lies on the cam face D2, to complete loading of the second IC card 1, as shown in FIGS. 21D to 21A.

For ejecting the first IC card 1 from the state of FIG. 20A, first the push rod 5 held at the push-in position is pushed forward, that is, the pushing motion is performed, causing the knob 15 of the push rod 5 to be projected up to the first projecting position, as shown in FIGS. 2 and 13.

Once the push rod 5 held at the push-in position is pushed, the bent portion 16c of the transfer pin 16 shifts from the cam face B1 of the first heart cam groove 11 to the cam face A1, as shown in FIG. 20B. If in this state the pushing motion of the push rod 5 is cancelled, the bent portion 16c shifts from cam face A1 to cam face D1 through cam faces H and E1 under the pulling force of the coiled spring 18.

At this time, the bent portion 16c does not return to the cam face B1 because the cam face A1 is lower than cam face B1.

To be more specific, the state of the bent portion 16c shifts from FIGS. 20B to 20D via 20C. As shown in FIG. 20D, the bent portion 16c of the transfer pin 16 and the receiving portion 13a of the first drive plate 13 become engageable with each other.

Thus, when the knob 15 of the push rod 5 is pushed toward the push-in position after allowing the push rod 5 to be projected up to the first projecting position, as shown in FIGS. 20E and 20F, the bent portion 16c of the transfer pin 16 shifts from the cam face D1 of the first heart cam groove 11 to the cam face C1 and in this shifting process the bent portion 16c presses the receiving portion 13a of the first drive plate 13, so that the ejection arm 6 engaged with the first drive plate 13 rotates.

With this rotation, the pawl pieces 7a and 8a of the first and second pivotable arms 7, 8 push both end portions of the first IC card 1 nearly straight in the disengaging direction, so that, as shown in FIG. 3, the first IC card 1 moves out of the press-fitted contact between its socket contacts and the pin contacts of the pin housing 3. Now, the first IC card can be ejected easily from the connector device by-holding this side of the IC card 1 with fingers.

During this pushing motion of the push rod 5, the bent portion 16c does not return to the cam face E1 because the cam face D1 is lower than the cam face E1.

When the pushing motion of the push rod 5 toward the push-in position is cancelled, as shown in FIG. 20G, the push rod 5 is pushed back by the coiled spring 18, the bent portion 16c of the transfer pin 16 leaves the cam face C1 of the first heart cam groove 11 and reaches the cam face B1, and the push rod assumes its push-in position at which the bent portion 16c is engaged with the cam face B1.

At this time, the bent portion 16c does not return to the cam face D1 because the cam face C1 is lower than the cam face D1.

As to the ejection of the second IC card which has been inserted into the connector device in the manner described above, an explanation will now be given mainly with reference to FIGS. 20A to 20G and 21A to 21D. FIG. 20A shows a state in which the push rod 5 is held in the push-in position after the loading of the second IC card 1. For ejecting the second IC card, first in this state the push rod 5 is pushed in the same manner as above, whereby the push rod is projected up to the first projecting position and the bent portion 16c of the transfer pin 16 stops in the cam face D1 of the first heart cam groove 11, as shown in FIG. 20D and FIG. 13.

When the push rod 5 lying in the first projecting position is pulled to this side up to the second projecting position shown with a dotted line in FIG. 2 and also shown in FIG. 14, the bent portion 16c of the transfer pin 16 leaves the common cam face D1 of both first and second heart cam grooves 11, 12, then passes the cam faces J and E2 of the second heart cam groove 12 and reaches the cam face D2, as shown in FIG. 21A. The bent portion 16c is now engageable with the receiving portion 14a of the second drive plate 14.

When the knob 15 of the push rod 5 now lying in the second projecting position is pushed toward the push-in position, the bent portion 16c of the transfer pin 16 passes through the state of FIG. 21B and shifts from the cam face D2 of the second heart cam groove 12 to the cam face C2 thereof, as shown in FIG. 21C. In this shifting process, the bent portion 16c presses the receiving portion 14a of the second drive plate 14, so that the ejection arm 6 engaged with the second drive plate 14 rotates.

With this rotation, the pawl pieces 7a and 8a of the first and second pivotable arms 7, 8 push both end portions of the second IC card 1 nearly straight in the ejecting direction, so that, as shown in FIG. 3, the press-fitted state of the pin contacts 2 of the pin housing 3 in the socket contacts of the second IC card 1 is cancelled and the first IC card 1 can be ejected easily from the connector device easily by holding this side of the IC card 1 with user's fingers.

During the pushing motion of the push rod 5, the bent portion 16c does not return to the cam face E2 because the cam face D2 is lower than cam face E2.

Then, when the pushing motion of the push rod 5 is cancelled, the bent portion 16c of the transfer pin 16 shifts from the cam face C2 of the second heart cam groove 12 to the cam face B2 thereof, as shown in FIG. 21D, and the push rod 5 is retained in this push-in position, assuming such a state as shown in FIGS. 1 and 12.

At this time, the bent portion 16c shifts to the cam face B2 without return to the cam face D2 because the cam face C2 is lower than cam face D2.

Next, for ejecting the first IC card from its state shown in FIG. 21D, the push rod 5 lying in the push-in position is pushed in the same manner as above.

As a result, the bent portion 16c of the transfer pin 16 leaves the cam face B2 of the second heart cam groove 12, passes the common cam faces A1, H and E1 of both heart cam grooves and reaches the cam face D1, as shown in FIG. 20D.

At this time, the bent portion 16c does not return to the cam face B2 because the cam face A1 is lower than cam face B2.

If the push rod 5 is pushed in this state assuming the first projecting position, there are performed the same operations as in FIG. 20 in the foregoing normal operation mode.

As will be seen from the above description, when the push rod 5 is projected up to the first projecting position and is pushed toward the push-in position, the pushing force of the push rod is transmitted to the drive plate 13 through a single transfer pin 16 which traces the first heart cam groove 11, whereby the first IC card can be ejected.

For ejecting the second IC card 1, the push rod 5 is projected from the first to the second projecting position and is thereafter pushed toward the push-in position. As a result, the same transfer pin 16 as above traces the second heart cam groove 12 and the second drive plate 14 is moved by the transfer pin 16, whereby the second IC card 1 can be ejected.

Although in the above embodiment the first and second heart cam grooves 11, 12 use the cam faces A1, H and E1 in common, these cam faces may be formed in a separated manner.

Although in the above embodiment the retaining portions 4f are formed on each frame 4 and the retaining pieces 15c having resilience are formed on the knob 15, a modification may be made such that the retaining portions are formed on either the fixed side such as frame 4 or the movable side such as push rod 5 or knob 15 and the retaining pieces having resilience are formed on the other.

According to the present invention, as set forth above, when the first IC card 1 as inserted into the connector device is to be ejected, the push rod 5 is projected up to the first projecting position and is pushed in this state, whereby the IC card 1 is ejected through a single transfer pin 16. For ejecting the second IC card 1, the push rod 5 is pulled from the first projecting position and is projected up to the second projecting position which is located on this side with respect to the first projecting position, then in this state the push rod is pushed toward the push-in position, so that the second IC card 1 is ejected by rotation of a single transfer pin 16. Thus, a single push rod 5 and a single transfer pin 16 suffice to afford a connector device which is reduced in the number of components used, less expensive, superior in assembling performance and small-sized.

Moreover, since the ejection of the first and second IC cards is performed by juxtaposed, first and second heart cam grooves 11, 12, a single transfer pin 16 which traces the heart cam grooves 11 and 12, and the first and second drive plates 13, 14 capable of being engaged with and disengaged from the transfer pin 16, the number of components and the space required can be reduced and it is possible to provide a connector device which is superior in assembling performance, less expensive and small-sized.

Further, since the cam faces of the first and second heart cam grooves 11, 12 are partially used in common, it is possible to provide a connector device of a smaller size.

At the push-in position of the push rod 5 the transfer pin 16 is locked in the first or the second cam groove 11 or 12, while when the push rod 5 is in the first projecting position, the transfer pin 16 is engageable with the first drive plate 13. When the push rod 5 is pushed at the first projecting position, the transfer pin 16 passes cam faces of the first heart cam groove 11 and presses the first drive plate 13 to eject the first IC card 1. When the push rod 5 lying in the first projecting position is pulled, the transfer pin 16 is in a state in which it can be engaged with the second drive plate 14. In this state, when the push rod 5 is pushed, the transfer pin 16 passes cam faces of the second heart cam groove 12 and moves the second drive plate 14 to eject the second IC card 1. Thus, it is possible to provide a connector device which is simple in construction, reduced in the number of components used, less expensive, small-sized and reliable in its IC card ejecting motion.

Further, since the upper side portion 16a of the U-shaped transfer pin 16 is brought into abutment against the protuberance 5d of the push rod 5 and is pressed elastically by the resilient member 17 between the bent portion 16c of the transfer pin 16 engaged with a cam face and the protuberance 5d, the transfer pin 16 is sure to trace the cam face, so not only the push rod 5 can be operated accurately, but also it is possible to provide a connector device which permits smooth movement of the transfer pin 16.

Further, since the bent portions 16b and 16c of the U-shaped transfer pin 16 are of the same length, the transfer pin can be mounted without the need of taking its directionality into account at the time of assembly and thus it is possible to provide a connector device superior in productivity.

Further, since a retaining piece having resilience is disposed on either the fixed side such as a frame 4 or the movable side such as the knob 15 and a retaining portion is formed on the other so as to be engageable and disengageable with respect to each other, it is possible to realize, with a simple construction, the locking motion of the push rod 5 in the first projecting position and the moving motion thereof from the first to the second projecting position, thus permitting the provision of a connector device which is superior in assembling performance and inexpensive.

Further, according to the construction wherein the knob 15 is provided with a retaining piece 15c having resilience and the frame 4 is provided with a retaining portion 4f, it is possible to realize, with a simpler construction, the locking of the push rod 5 in the first projecting position and moving motion thereof from the first to the second projecting position, thus permitting the provision of a less expensive connector device superior in assembling performance.

What is claimed is:

1. A connector device for IC card, including:
    a frame for supporting first and second IC cards so as to permit insertion and ejection of the IC cards with respect to the connector device;
    a push rod capable of reciprocating between a push-in position and a projecting position; and
    a transfer pin secured to said push rod pivotably, wherein with the first and/or second IC card inserted into the connector device, said push rod is held at the push-in position by a lock mechanism of said transfer pin, and in this state, by a first pushing motion of the push rod, said lock mechanism of the transfer pin is unlocked and the push rod moves to said first projecting position, then at the first projecting position the first IC card is ejected by the transfer pin in accordance with a second pushing motion of the push rod, the push rod being movable to a second projecting position projecting to a further extent from the first projecting position, further, when the push rod is at the first projecting position, the push rod is moved to the second projecting position by a pulling motion thereof, and with the push rod lying at the second projecting position the transfer pin is rotated to effect the ejection of the second IC card when the push rod performs the pushing motion.

2. A connector device for IC card according to claim 1, wherein said lock mechanism is made up of two, juxtaposed, first and second heart cam grooves, said transfer pin is rotated and allowed to trace said first and second heart cam grooves, further, two, first and second drive plates engageable with and disengageable from the transfer pin and capable of reciprocation are provided, and when said push rod lying at said first projecting position is pushed, the transfer pin, in an engageable state with said first drive plate, traces said first heart cam groove and moves the first drive plate, causing the IC card to be ejected through the first drive plate, while when the push rod lying at said second projecting position is pushed, the transfer pin, in an engageable state with said second drive plate, traces said second heart cam groove and moves the second drive plate to effect the ejection of the second IC card through the second drive plate.

3. A connector device for IC card according to claim 2, wherein adjacent cam grooves of said juxtaposed, first and second heart cam grooves are used partially in common.

4. A connector device for IC card according to claim 2, wherein when said push rod is at said push-in position, said transfer pin is locked by said first heart cam groove and is disengaged from said first drive plate, and when the push rod is pushed at the push-in position, the transfer pin moves together with the push rod and traces the first heart cam groove, with the transfer pin becoming engageable with the first drive plate, allowing the push rod to assume said first projecting position, while when the push rod is pulled at the first projecting position into said second projecting position, the transfer pin becomes engageable with said second drive plate, then when the push rod is pushed in this state, the transfer pin traces said second heart cam groove and is locked by the second heart cam groove, allowing the push rod to assume the push-in position, sand the transfer pin becomes disengaged from the second drive plate, further, when the push rod is pushed to the push-in position, the transfer pin moves together with the push rod and traces the second heart cam groove, with the transfer pin becoming engageable with the first drive plate, allowing the push rod to assume the first projecting position.

5. A connector device for IC card according to claim 2, wherein said transfer pin is formed in U shape having an upper side portion and bent portions formed at both ends of said upper side portion, said push rod has a protuberance, said upper side portion of the transfer pin is brought into abutment against said protuberance, one said bent portion of the transfer pin is brought into engagement with said heart cam grooves, and between the one bent portion of the transfer pin and said protuberance, said upper side portion of the transfer pin is pressed resiliently by a resilient member.

6. A connector device for IC card according to claim 5, wherein said bent portions formed at both ends of said upper side portion of said U-shaped transfer pin have the same length.

7. A connector device for IC card according to claim 1, wherein a knob is attached to said push rod which is a movable side connected movably to said frame which is a fixed side, a retaining piece having resilience is provided on either said fixed side or said movable side and a retaining portion is provided on the other side, said retaining piece and said retaining portion coming into engagement with each other when said push rod is at said first projecting position, to retain the push rod at the first projecting position, said retaining piece and said retaining portion becoming disengaged from each other when the push rod lying at the first projecting position is pulled, to permit movement of the push rod to second second projecting position.

8. A connector device for IC card according to claim 7, wherein said retaining piece is provided on said knob side and said retaining portion is provided on said frame side.

\* \* \* \* \*